US008861397B2

(12) United States Patent
Kind et al.

(10) Patent No.: US 8,861,397 B2

(45) Date of Patent: Oct. 14, 2014

(54) APPARATUS AND METHOD FOR ANALYZING A NETWORK

(71) Applicant: International Business Machines Corporation, Armonk, NY (US)

(72) Inventors: Andreas Kind, Rueschlikon (CH); Jan Van Lunteren, Rueschlikon (CH)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 13/868,402

(22) Filed: Apr. 23, 2013

(65) Prior Publication Data

US 2013/0238792 A1 Sep. 12, 2013

Related U.S. Application Data

(63) Continuation of application No. 12/520,114, filed on Jun. 19, 2009, now abandoned.

(30) Foreign Application Priority Data

Dec. 19, 2006 (EP) .................................... 06126520

(51) Int. Cl.
*H04L 12/26* (2006.01)
*H04L 29/06* (2006.01)

(52) U.S. Cl.
CPC .............. *H04L 43/08* (2013.01); *H04L 43/026* (2013.01); *H04L 63/1425* (2013.01)
USPC ............ 370/253; 370/235; 709/224; 717/143

(58) Field of Classification Search
USPC .......... 370/235, 238, 389, 392; 709/230, 234; 717/143
See application file for complete search history.

(56) References Cited

U.S. PATENT DOCUMENTS 5,781,729 A 7/1998 Baker et al.
6,665,725 B1* 12/2003 Dietz et al. .................... 709/230
8,239,565 B2 8/2012 Irino et al.
(Continued)

FOREIGN PATENT DOCUMENTS

CN 1324162 A 11/2001
CN 1324162 A 11/2001
(Continued)

OTHER PUBLICATIONS

Sadasivan et al (Architecture for IP Flow Information Export), Sep. 2006.*

(Continued)

*Primary Examiner* — Michael Thier
*Assistant Examiner* — Vincelas Louis
(74) *Attorney, Agent, or Firm* — Cantor Colburn LLP

(57) ABSTRACT

An apparatus and method for analyzing a network flow. The apparatus includes a parser for extracting flow identification information from the network flow, a flow metering unit, and a programmable controller. The parser and flow metering unit are controlled in parallel by the programmable controller, the programmable controller is implemented as state machine, and the state machine includes a transition rule memory, a rule selector, and a state register. The rule selector is configured for receiving an external input signal and an internal input signal from the state register. The rule selector is also configured for observing the internal and external input signal via the transition rule memory.

14 Claims, 8 Drawing Sheets

(56) References Cited

U.S. PATENT DOCUMENTS

| | | | | |
|---|---|---|---|---|
| 2003/0061401 | A1 * | 3/2003 | Luciani, Jr. | 709/324 |
| 2005/0132342 | A1 * | 6/2005 | Van Lunteren | 717/143 |
| 2005/0238022 | A1 | 10/2005 | Panigrahy | |
| 2007/0115825 | A1 | 5/2007 | Roberts | |
| 2007/0140128 | A1 * | 6/2007 | Klinker et al. | 370/238 |
| 2007/0237079 | A1 * | 10/2007 | Whitehead | 370/235 |
| 2007/0248084 | A1 | 10/2007 | Whitehead | |
| 2009/0125671 | A1 | 5/2009 | Flynn et al. | |

FOREIGN PATENT DOCUMENTS

| | | | |
|---|---|---|---|
| EP | 1694004 | A | 8/2006 |
| EP | 1694004 | A1 | 8/2006 |
| JP | 11127198 | | 5/1999 |
| JP | 2002-538725 | A | 11/2002 |
| JP | 2002-374251 | A | 12/2002 |
| JP | 2005538624 | | 12/2005 |
| JP | 2006-020317 | A | 1/2006 |
| JP | 2006338672 | | 12/2006 |

OTHER PUBLICATIONS

International Search Report—PCT; International Application No: PCT/IB2007/054447; International Filing Date: Nov. 2, 2007; Date of Mailing: May 23, 2008, pp. 1-4.

Atsushi Takagi et al."Design and Implementation of Packet Selection Processor Based on Quantity and Contents" IPSJ SIG Technical Report, Nov. 26, 2003, vol. 2003 No. 118 p. 97-102.

Sadasivan, "Architecture for IP Flow Information Export", Sep. 6, 2006, IETF Standard Working Draft.

Brownlee, "Traffic Flow Measurement: Architecture", Oct. 1, 1999, IETF Standard.

Amit, "IBM eServer i5 and iSeries: Logical Partitioning FAQs", Jun. 4, 2004.

* cited by examiner

300

APPARATUS AND METHOD FOR ANALYZING A NETWORK

CROSS-REFERENCE TO RELATED APPLICATION

This application is a continuation of U.S. patent application Ser. No. 12/520,114, filed Jun. 19, 2009, which is a U.S. 371 national stage of application no. PCT/IB2007/54447, filed on Nov. 2, 2007. Priority under 35 U.S.C. §119(a) and 35 U.S.C. §365(b) is claimed from European Patent Application No. 06126520.3, filed Dec. 19, 2006, and all the benefits accruing therefrom under 35 U.S.C. §119, the contents of which in its entirety are herein incorporated by reference.

BACKGROUND OF THE INVENTION

1. Field of the Invention

The invention relates to an apparatus, a method and a computer program for analyzing a network flow.

2. Description of Related Art

Communication networks, e.g. networks according to the Internet Protocol (IP) are complex and difficult to analyze and to monitor with respect to the end-to-end network traffic flows, also denoted as network flows. A known protocol for analyzing a network flow is the NetFlow protocol that is currently being standardized by the Internet Engineering Task Force (IETF). Details are provided in IETF IP Flow Information Export (IPFIX) at http://www.ieft.org/html.charters/ipfix-charter.html.

The NetFlow protocol provides technology for network accounting, bandwidth usage analysis, network anomaly detection, traffic engineering and capacity management.

NetFlow is supported at routers, switches, metering appliances and software-based traffic meters. Some high-end routers and switches support NetFlow with dedicated hardware extensions.

The realization of extensions in a router or switch for NetFlow or for other network analysis protocols is typically expensive because the extension has to be well integrated into the specific forwarding and routing architecture of the router or switch.

It is an object of the invention to provide improved solutions for network flow analysis. It is a further object of the invention to provide an improved apparatus, an improved method, an improved computer system and an improved computer program for analyzing a network flow.

SUMMARY OF THE INVENTION

The present invention is directed to an apparatus, a computer system, a computer program and a method as defined in independent claims. Further embodiments of the invention are provided in the appended dependent claims.

According to a first aspect of the invention there is provided an apparatus for analyzing to a network flow, comprising a parser for extracting flow identification information from the network flow, a flow metering unit for metering the network flow, a programmable controller for controlling the flow metering unit and the parser.

The architecture of the apparatus according to this aspect of the invention allows for an efficient, flexible and fast implementation of a flow metering function that is able to support a large number of configuration options. Such configuration options might cover different versions of today's or future standards. This architecture provides the benefits of high performance without the drawback of fixed metering functionality and interfaces which only support a single standard.

The modular approach of this architecture comprises a parser that is provided for receiving a network flow and for extracting flow identification information from this network flow. The parser can be programmed to extract any desirable combination of flow identification information from the network flow. The flow identification information might e.g. be contained in fields of packet headers of a network flow. As an example, the parser can be programmed to extract the corresponding header fields that are relevant for a specific protocol standard. The flow identification information might comprise e.g. the source and destination IP address, the source and destination port and the IP protocol of the analyzed network flow.

The network flow identified by the flow identification information is metered by a flow metering unit. The metering of the flow identification information might e.g. comprise timestamps for the respective network flow start and finish time, the number of bytes and packets observed in the respective network flow and various other features of the observed network flow.

Both the flow metering unit and the parser are controlled in parallel by a programmable controller. The programmable controller can be individually programmed for the respective application environment, the used protocol standards of to the network flow (e.g. NetFlow v5, v7, v9, IPFIX), the number of flows to be supported and the speed of the respective network. Hence the parser and the flow metering unit are generic units. The specific functionality of these generic units is determined by the programmable controller.

According to an embodiment of this aspect of the invention the flow metering unit is provided for sending flow status information to the programmable controller and the programmable controller is provided for sending flow metering instructions to the flow metering unit in dependence on the flow status information.

Such a control loop between the flow metering unit and the programmable controller facilitates an efficient, fast and flexible flow metering process and processing.

According to another embodiment of this aspect of the invention the parser is provided for sending parsing information to the programmable controller and the programmable controller is provided for sending parsing instructions to the parser in dependence on the parsing information.

Such a control loop between the parser and the programmable controller facilitates an efficient, fast and flexible parsing process and processing.

According to another embodiment of this aspect of the invention the programmable controller is provided for evaluating in parallel two or more flow status information values of the flow metering unit, sending two or more flow metering instructions in parallel to the flow metering unit.

Such a parallel processing structure further facilitates an efficient, fast and flexible flow metering process and processing.

According to another embodiment of this aspect of the invention the programmable controller comprises a program memory comprising two or more flow metering to programs.

The two or more flow metering programs can e.g. be programmed for different versions of network analysis protocols, for different application environments, for different numbers of flows to be supported and for different speeds of the network.

This allows for changing the configuration and application of the apparatus very quickly and easily. Furthermore, it is a flexible and cost effective solution.

According to another embodiment of this aspect of the invention the programmable controller is implemented as programmable state machine.

The implementation of the programmable controller as programmable state machine is a flexible and cost effective solution.

According to another embodiment of this aspect of the invention the programmable state machine comprises a transition rule memory, a rule selector and a state register, wherein the rule selector is provided for receiving an external input signal and an internal input signal from the state register indicating the current state and wherein the rule selector is provided for observing the internal and external input signal by means of the transition rule memory for transition rules and for changing the state of the state register and generation of an output signal comprising parsing and/or flow metering instructions when a transition rule applies.

This embodiment is an efficient way of implementing the programmable state machine.

The transition rule memory is provided for storing a set of transition rules. A set of transition rules may establish a flow metering program. For different versions of network analysis protocols, for different application environments, for different numbers of flows to be supported and for different speeds of the network a plurality of sets of transition rules might be loaded into the transition rule memory.

The rule selector is provided for receiving an external input signal and an internal input signal from the state register. The internal input signal from the state register indicates the current state of the programmable state machine. The external input signal or the external input signals are received from the flow metering unit and/or the parser. The external input signal of the state machine may comprise flow status information, parser information and various other information.

The rule selector observes the internal and external input signal by means of the transition rule memory for transition rules. If a predefined transition rules applies, the programmable state machine changes the state of the state register and generation an output signal comprising parsing and/or flow metering instructions In other words, the programmable state machine observes the flow status information and/or the parsing information for predefined states. The state machine changes its state, when such a predefined state is detected. Then the changing state of the state machine triggers control actions for the parser and/or the flow metering unit.

According to another embodiment of this aspect of the invention the flow-metering unit comprises a flow table unit a flow table management unit and a flow information export unit.

The flow table unit comprises a memory for storing information about the network flows that are analyzed by the apparatus. The flow table might e.g. use the 5-tuple definition to characterise a specific network flow. In other words, the flow table may provide an entry for each specific network flow characterized by the 5-tuple definition. According to the example of the 5-tuple definition, a network flow is defined as a unidirectional sequence of packets that have the same source and destination IP address, the same source and destination port and the same IP protocol.

For each such entry the flow table may store flow metering information, e.g. to timestamps for the respective network flow start and finish time, the number of bytes and packets observed in the respective network flow and various other features of the observed network flow.

The flow table management unit is provided for managing the entries of the flow table. The flow table management unit is controlled by the programmable controller. This flow table management unit may be provided to execute various flow metering instructions received from the programmable controller. Such flow metering instructions may include instructions for updating the flow table unit, creating a new entry in the flow table unit and checking the status or specific entries of the flow table unit. The flow table management unit may be implemented using a conventional hard-wired state machine.

As an example, the flow table management unit may check upon reception of a check-command from the programmable controller if the flow table already contains an entry for an identified network flow. As a result it could provide an indication (implemented as a single-bit flag) back to programmable controller that indicates if an entry for this identified network flow already exists or that the identified network flow is a new flow that is not present in the flow table of the flow table unit.

In response to receiving the indication that a network flow either exists or not, the programmable controller may dispatch further flow metering instructions to the table management unit to either update an existing flow table entry, to create a new flow table entry or to create a complete new flow table with a corresponding "update", "create new flow table entry" or "create new flow table" command.

The flow information export unit is provided for exporting flow information to another location or entity. The flow information export unit is controlled by the programmable controller as well. The programmable controller may trigger the export of flow metering information by dispatching an export-command to the flow information export unit.

According to another embodiment of this aspect of the invention the flow table management unit comprises a programmable hash function unit provided with two or more selectable hash functions for mapping the flow identification information on a hash index, wherein the programmable controller is provided for selecting one of the selectable hash functions.

Hash functions are widely used to improve the efficiency of network flow analysis and network flow metering. However, different standards and different protocol versions of flow metering standards use different hash functions. By means of providing a programmable hash function unit, the apparatus according to this embodiment of the invention can support these different standards and protocol versions.

According to another embodiment of this aspect of the invention the programmable controller is provided for sending table management commands to the table management unit.

Such table management commands may be e.g. an update-command, a create-command or a check-command.

According to another embodiment of this aspect of the invention the apparatus is implemented as hardware assist device.

The implementation of the apparatus as hardware assist device has the advantage that it can be implemented in a system without requiring processor or processing load of this system.

A second aspect of the invention relates to a computer system comprising a central processing unit, a memory and a computer networking device, comprising an apparatus according to the first aspect of the invention for analyzing the network flow in the computer networking device.

The computer networking device may be e.g. a switch or a router. The apparatus works as hardware assist device for the central processing unit of the computer system. This allows for an analysis of the network flow without loading the central processor.

A third aspect of the invention relates to a computer system comprising two or more virtual computing systems, further comprising an apparatus according to the first aspect of the invention, wherein the apparatus is provided for analyzing the network flow between the virtual computing systems and/or between the virtual computing systems and an external device.

This allows for monitoring and analyzing the network flow between the virtual computing systems in a scalable way without any additional software to be available on the computer system and on the virtual computing systems.

According to a further embodiment of this aspect of the invention the computer system comprises a software networking device for internal communication between the virtual computing systems, a hardware networking device for external communication between the virtual computing systems and an external device, wherein the software networking device and the hardware networking device are provided for forwarding the network flow between the virtual computing systems and/or between the virtual computing systems and an external device for an analysis to the apparatus according to the first aspect of the invention.

This architecture allows for an efficient implementation of a network flow function within a virtualized environment.

The software networking device may be e.g. a software switch, i.e. a switch implemented in software. The hardware networking device may be e.g. a hardware switch, i.e. a switch implemented in hardware.

The external device can be e.g. another computer system, a network, the internet or any other destination.

According to a further embodiment of this aspect of the invention the apparatus is arranged in the hardware networking device.

A fourth aspect of the invention relates to a method for analyzing a network flow, comprising the steps of extracting flow identification information from the network flow by means of a parser, metering the network flow by means of a flow metering unit, controlling the flow metering unit and the parser by means of a programmable controller.

A fifth aspect of the invention relates to a flow metering computer program comprising instructions for carrying out a flow metering program on a programmable controller, the flow metering computer program being provided for controlling the flow metering unit and the parser of an apparatus according to the first aspect of the invention.

Preferred embodiments of the present invention are described in detail below, by way of example only, with reference to the following schematic drawings, in which:

BRIEF DESCRIPTION OF THE DRAWINGS

The drawings are provided for illustrative purposes only and do not necessarily represent practical examples of the present invention to scale. In the figures, same reference signs are used to denote the same or like parts.

DETAILED DESCRIPTION OF THE PREFERRED EMBODIMENTS

Figure 1:
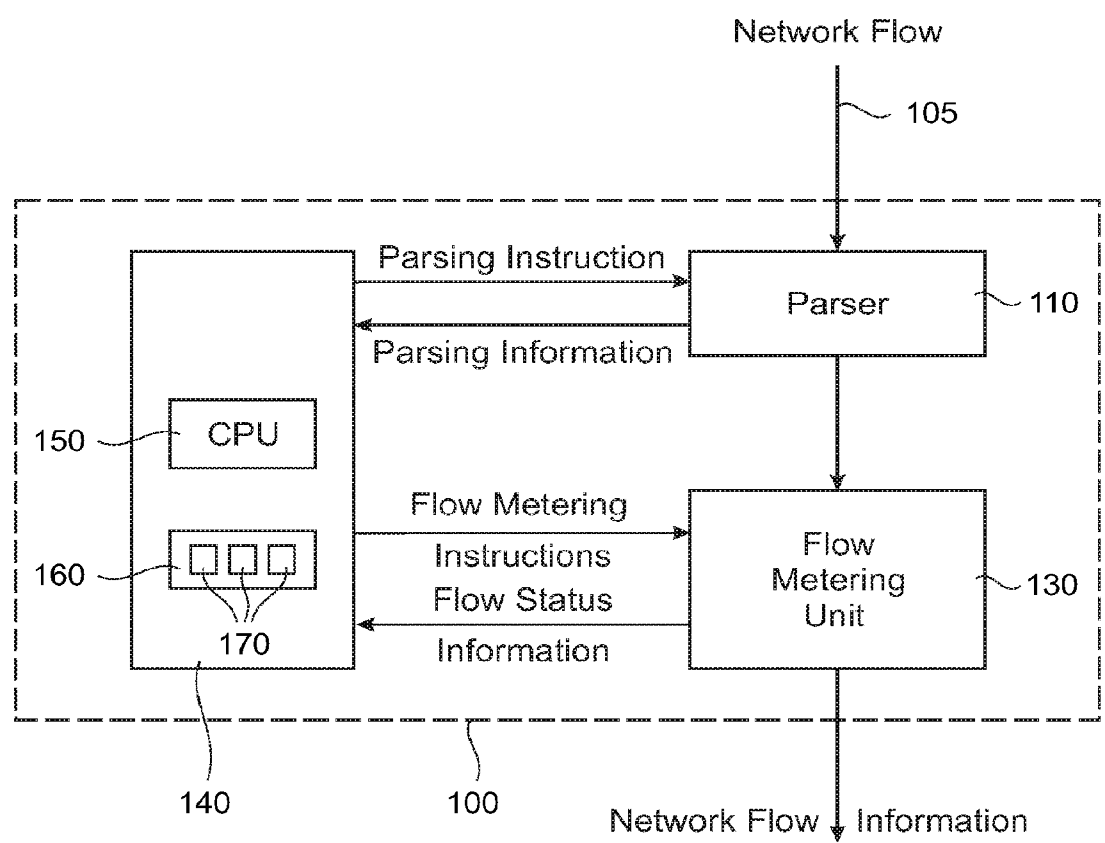
FIG. 1 is a schematic drawing of an apparatus for analyzing a network flow according to an embodiment of the invention, comprising a programmable controller, a parser and a flow metering unit.

FIG. 1 shows an apparatus 100 for analyzing a network flow 105 according to an exemplary embodiment of the invention. The apparatus 100 comprises a parser 110 for extracting flow identification information from the network flow 105. The network flow 105 may be any kind of communication traffic in a network, in particular end to end network traffic. The network flow 105 may comprise a sequence of data packets, wherein each data packet is part of a communication between two distinct network addresses. The apparatus 100 comprises a flow metering unit 130 for metering the network flow 105 and a programmable controller 140 for controlling the flow metering unit 130 and the parser 110.

The flow metering unit 130 is provided for sending flow status information to the programmable controller 140 and the programmable controller 140 is provided for sending flow metering instructions to the flow metering unit 130 in dependence on the flow status information. Furthermore, the parser 110 is provided for sending parsing information to the programmable controller 140 and the programmable controller 140 is provided for sending parsing instructions to the parser 110 in dependence on the parsing information.

The programmable controller 140 comprises a central processing unit 150 and a program memory 160. In the program memory 160 one or more flow metering programs 170 can be stored.

The apparatus 100 is preferably implemented in hardware and may be used as hardware assist device. This is further illustrated with reference to FIG. 2.

Figure 2:
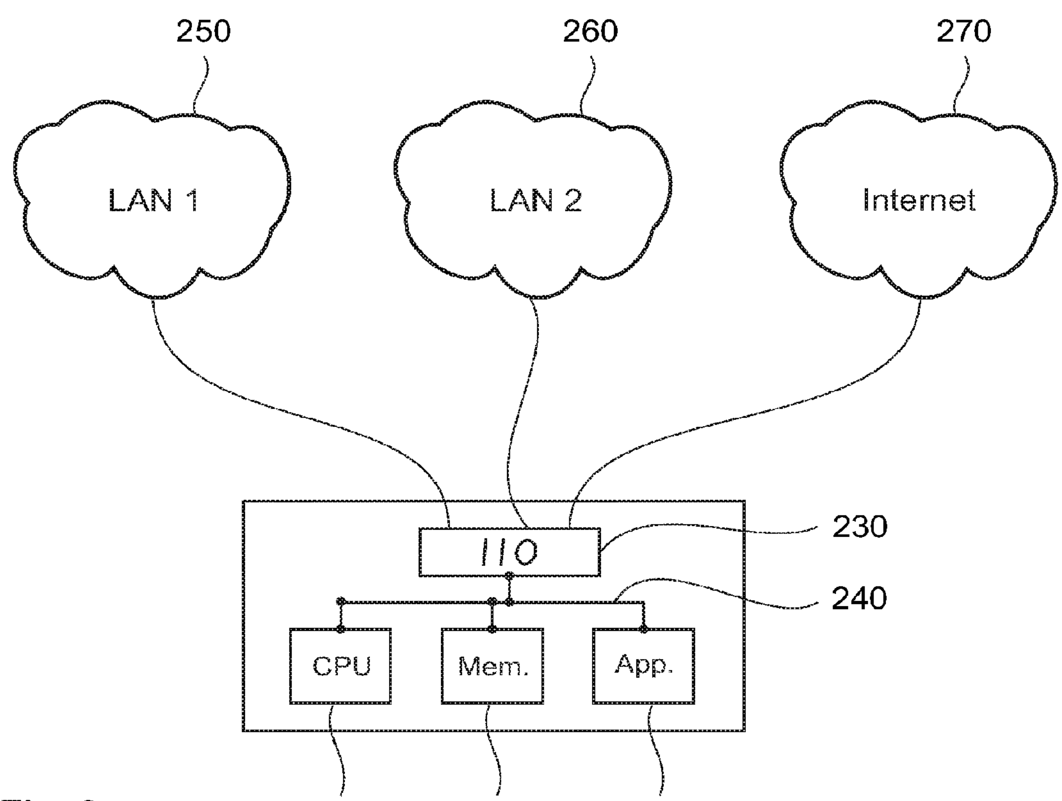
FIG. 2 shows a schematic computer system comprising a computer networking to device and an apparatus for analyzing the network flow in the computer networking device.

FIG. 2 shows a computer system 200 comprising a central processing unit 210, a memory 220 and a computer networking device 230. Furthermore it comprises the apparatus 100 for analyzing a network flow. The apparatus 100 is implemented in hardware as hardware assist device for the central processing unit 210. The central processing unit 210, the memory 220, the computer networking device 230 and the apparatus 100 are coupled via an internal bus system 240.

The computer networking device 230 may be any kind of Input/Output device, e.g. a router or a switch. In the example of FIG. 2 the computer networking device 230 serves as router between a first Local Area Network (LAN) 250, a second LAN 260 and the Internet 270. Accordingly, the computer networking device 230 is provided for routing network flows 280 between the first LAN 250, the second LAN 260 and the Internet 270. The apparatus 100 is provided for analyzing and meter the network flow in the computer networking device 230.

Figure 3:
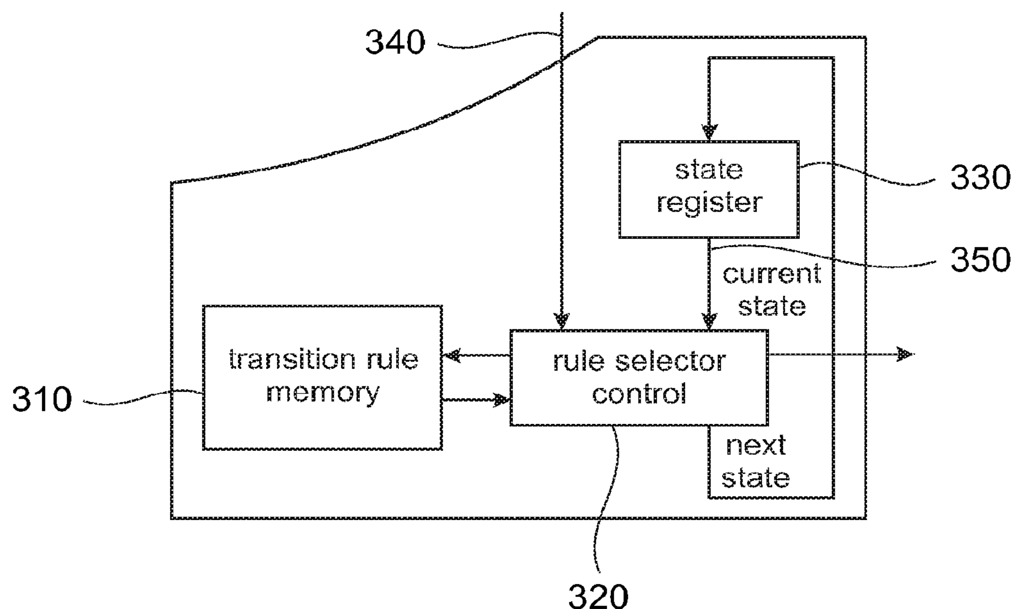
FIG. 3 is a schematic drawing of a programmable controller implemented as state machine.

FIG. 3 shows a schematic block diagram of a programmable controller 300 according to another exemplary embodiment of the invention. The programmable controller 300 is implemented as programmable state machine. The programmable controller 300 comprises a transition rule memory 310, a rule selector 320 and a state register 330. The rule selector 320 is provided for receiving as external input signal 340 parsing information from the parser 110 and flow status information from the flow metering unit 130 of FIG. 1. Furthermore, the rule selector 320 is provided for receiving an internal input signal 350 from the state register 330. This internal input signal 350 indicates the current state of the state register 330. The rule selector 320 observes the internal input signal 350 and the external input signal 340 by means of the transition rule memory 310 for transition rules. When a transition rule applies, the rule selector 320 is provided for changing the state of the state register 330 and sending parsing instructions to the parser 110 and/or flow metering instructions to the flow metering unit 130 of FIG. 1.

More details for implementation of a programmable state machine as shown in FIG. 3 are described in US 2005/0132342A1 which is herewith incorporated by reference.

Figure 4:
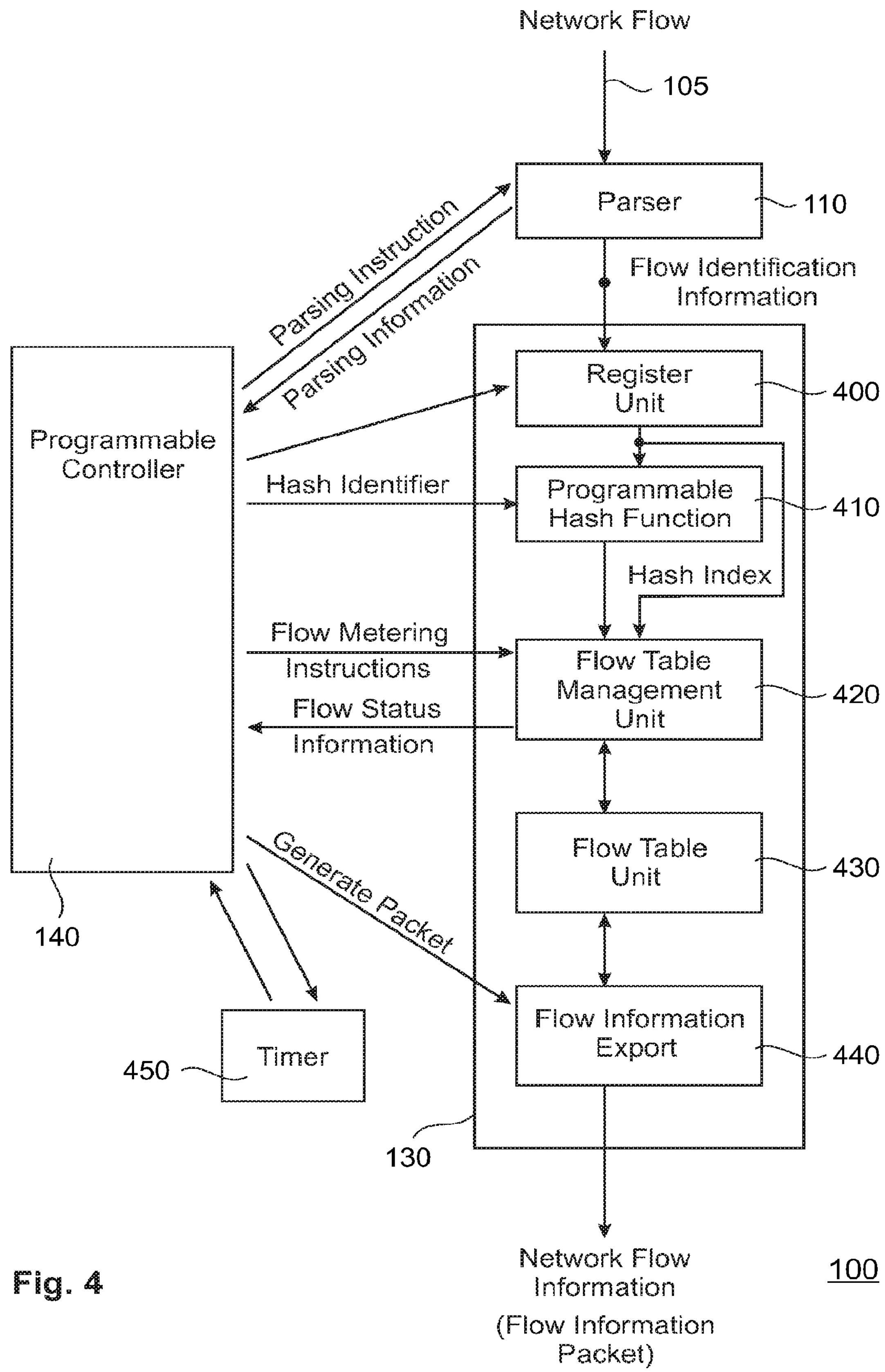
FIG. 4 is a schematic drawing of the apparatus of FIG. 1 in more detail.

FIG. 4 is a schematic drawing of the apparatus of FIG. 1 in more detail.

The parser 110 can be programmed by means of the programmable controller 140 to extract any desirable flow identification information from the network flow 105. According to an exemplary embodiment of the invention the network flow 105 comprises packets including a packet header and the parser 110 uses the packet headers to extract the flow identification information. Accordingly, the parser 110 may be programmed to extract any desirable combination of header fields from the packet header that will be used for flow identification. Examples of such header fields include IP source and destination addresses, Transmission Control Protocol (TCP) source and destination port numbers, Multi-Protocol Label Switching (MPLS) and Virtual Local to Area Network (VLAN) tags etc. Based on the protocol standard of the respective network analysis protocol, the parser 110 can be programmed to extract the corresponding header fields that are relevant for that protocol standard. The parser 110 is provided for writing the flow identification information of these header fields into a register unit 400. Hence the register unit 400 comprises registers with flow identification information derived from packet headers.

This flow identifying information is provided as input to a programmable hash function unit 410. The programmable hash function unit 410 maps the flow identification information stored in the register unit 400 on a hash index. In other words, the programmable hash function unit 410 maps the actual values of the selected header fields upon a hash index. The programmable hash function unit 410 may provide a variety of hash functions that cover all desired functions for the protocol versions that the apparatus 100 shall support. The programmable controller 140 is provided for selecting one of the available hash functions. The selection of one of the hash functions may be implemented by sending a hash identifier corresponding to that hash function from the programmable controller 140 to the programmable hash function unit 410. Such a hash identifier can consist of a short bit vector that uniquely corresponds to one of the implemented hash functions.

The flow metering unit 130 further comprises a flow table management unit 420. The flow table management unit 420 is provided to receive the hash index of the respective flow identification information of the respective packet header from the programmable hash function unit 410. The flow table management unit 420 manages and controls a flow table unit 430. The flow table management unit 420 can execute as flow metering instructions flow table management commands. Such flow table management commands may include e.g. commands for updating the flow table unit 430, for creating a new entry in the flow table unit 430, for checking entries of the flow table unit 430, for removing entries from the flow table unit 430 and for scanning the entries of the flow table unit 430. Preferably the flow table management unit 420 is implemented by means of a hardwired state machine. The flow table management commands are sent from the programmable controller 140 to the flow table management unit 420. The flow table unit 430 comprises a memory that stores network flow entries for network flows identified by the respective hash index. The network flow entries comprise key fields that define the flow and content fields that comprise information about the defined flow. The content fields are updated with every new packet of the network flow. The flow table unit 430 might e.g. use the 5-tuple definition to characterise and define the network flow in the key fields. In this example the key fields would comprise the source and destination IP address, the source and destination port and the IP protocol of the respective network flow.

For each such key field the flow table may store in the corresponding content fields flow metering information, e.g. timestamps for the respective network flow start and finish time, the number of bytes and packets observed in the respective network flow and various other features of the observed network flow.

As an example, upon reception of check-command from the programmable controller 140, the flow table management unit 420 will check if the flow table unit 430 already contains an entry for the network flow identified by the respective hash index. In return it will provide as flow status information an indication to the programmable controller 140 that indicates that the respective network flow exists or that the hash index corresponds to a new network flow that is not present in the flow table unit 430. Dependent on the hash function the flow table management unit 420 can also have direct access to the actual register values of the register unit 400, i.e. to the flow identification information stored in the register unit 400.

In response to receiving the flow status information that an identified network flow either exists or not, the programmable controller 140 may dispatch as flow metering instructions table management commands to the flow table management unit 420 to either update an existing flow table entry or to create a new flow table entry by means of an update or a create command.

Furthermore, the programmable controller 140 is provided for controlling the scanning of the flow table unit 430 for expired flow table entries. For this purpose, the to programmable controller 140 will test the value of a programmable timer 450 which can be configured to meet the characteristics of the supported protocol versions of the respective network analysis protocol. This will trigger the programmable controller 140 to send as table management command a scan instruction to the flow table management unit 420 after certain periods and/or at regular configurable intervals. The flow table management unit 420 will then scan the flow table unit 430 and report any expired flow table entries to the programmable controller 140. In response the programmable controller 140 can send a remove-command to remove these flow table entries to the flow table management unit 420. Furthermore, the programmable controller 140 can trigger the export of these expired flow table entries. In the latter case, the programmable controller 140 triggers the creation of a flow information packet containing information on the expired network flow. The programmable controller 140 sends a "generate packet" command to a flow information export unit 440. The flow information export unit 440 is also denoted as packet generator. The flow information export unit 440 can be implemented using a hardwired state machine. The flow information export unit 440 exports a flow information packet containing network flow information to a central server or any other destination.

By means of this programmable concept of the apparatus 100 the flow metering functions of the flow metering unit 130 can be implemented, configured and executed differently depending on the application environment, the used protocol standards (e.g. NetFlow v5, v7, v9, IPFIX), the number of network flows to be supported or the speed of the respective network.

For example, NetFlow v9 and IPFIX do not use fixed record fields, but a variable number of fields defined in flow templates. A template determines the content of the flow table and the amount of exported network flow information. In addition, multiple network flows can be aggregated and mapped on the same flow table entry. The flow table might contain various types of information for each network flow. Furthermore, the rules that determine when network flow information will be exported can vary.

Figure 5:
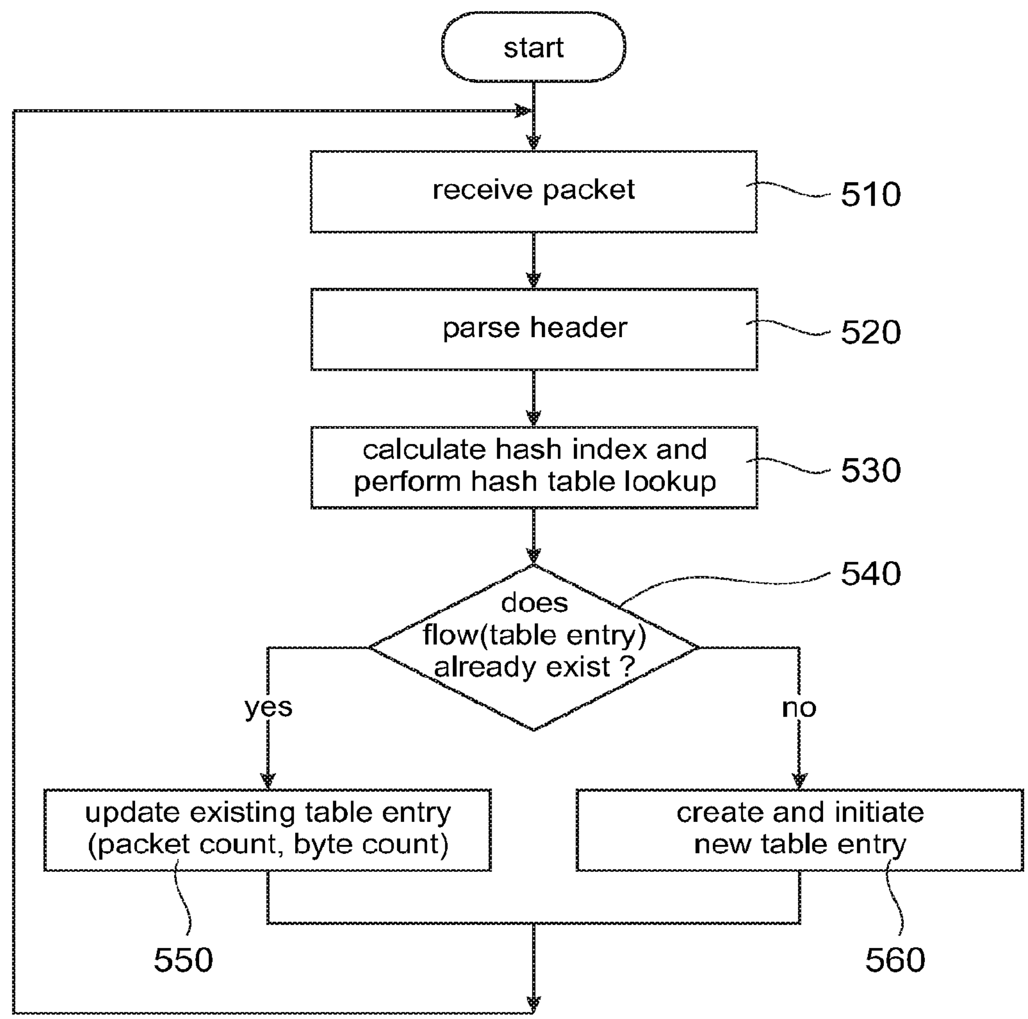
FIG. 5 shows a flow chart illustrating a flow table update function of the flow metering unit.

FIG. 5 shows a flow chart illustrating a flow table update function of the flow to metering unit 130.

In a step 510 the apparatus 100 receives a data packet of a network flow that is observed. In step 520 the parser 110 parses the header of the data packet, extracts the flow identification information and writes it in the register unit 400. In step 530 the programmable hash function unit 410 calculates the hash index of the flow identification information and the flow table management unit 420 performs a flow table (hash table) lookup in the flow table unit 430. In step 540 the flow table management unit 420 evaluates whether a flow table entry already exists for the respective hash index. If this is the case, the flow table management unit 420 updates in step 550 the respective flow table entry in the flow table unit 430. If this is not the case, the flow table management unit 420 creates in step 560 a new flow table entry in the flow table unit 430.

Figure 6:
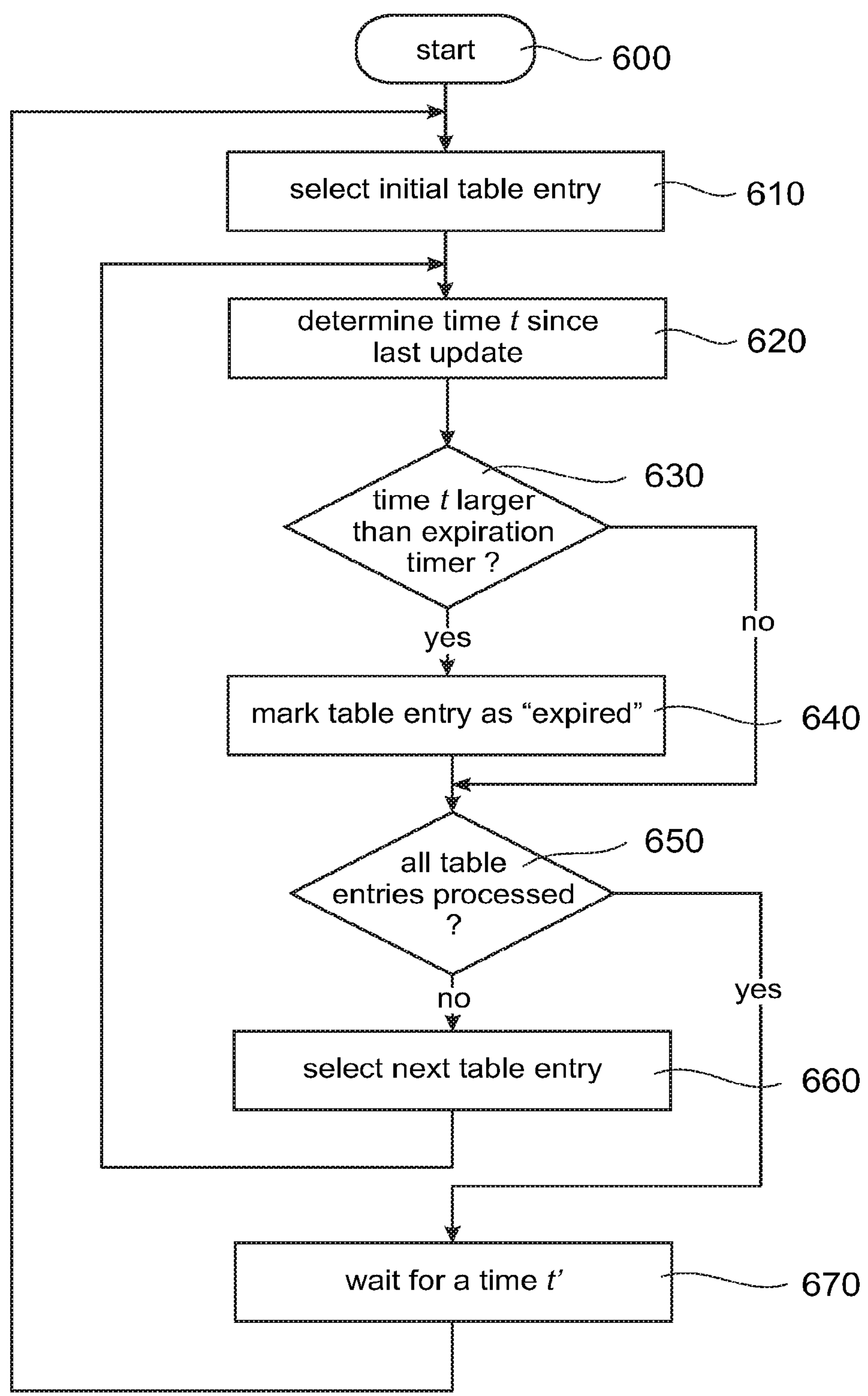
FIG. 6 shows a flow chart illustrating the determination of expired table entries of a flow table unit.

FIG. 6 shows a flow chart illustrating the determination of expired flow table entries in the flow table unit 430.

In step 600 the programmable controller 140 sends as flow metering instruction a scan-command to the flow table management unit 420. This can happen after certain time periods and/or at regular configurable intervals. The flow table management unit 420 will then scan the flow table unit 430. In step 610 the flow table management unit 420 selects an initial entry of the flow table unit 430 and determines in step 620 the time t since the last update. If the time t is larger than a predefined time, e.g. determined by the timer 450, the respective entry of the flow table unit 430 is marked as expired. In step 650 it is checked whether all entries of the flow table unit 430 have been processed, i.e. have been checked for expiration. If this is not the case, the flow table management unit 420 will select the next entry and continue with step 620. If the result of step 650 is that all entries of the flow table unit 430 have been processed, the scanning has been completed. The scanning function of the flow table management unit 420 waits then in step 670 for a time t' until it receives a new scan-command from the programmable controller 140.

Figure 7:
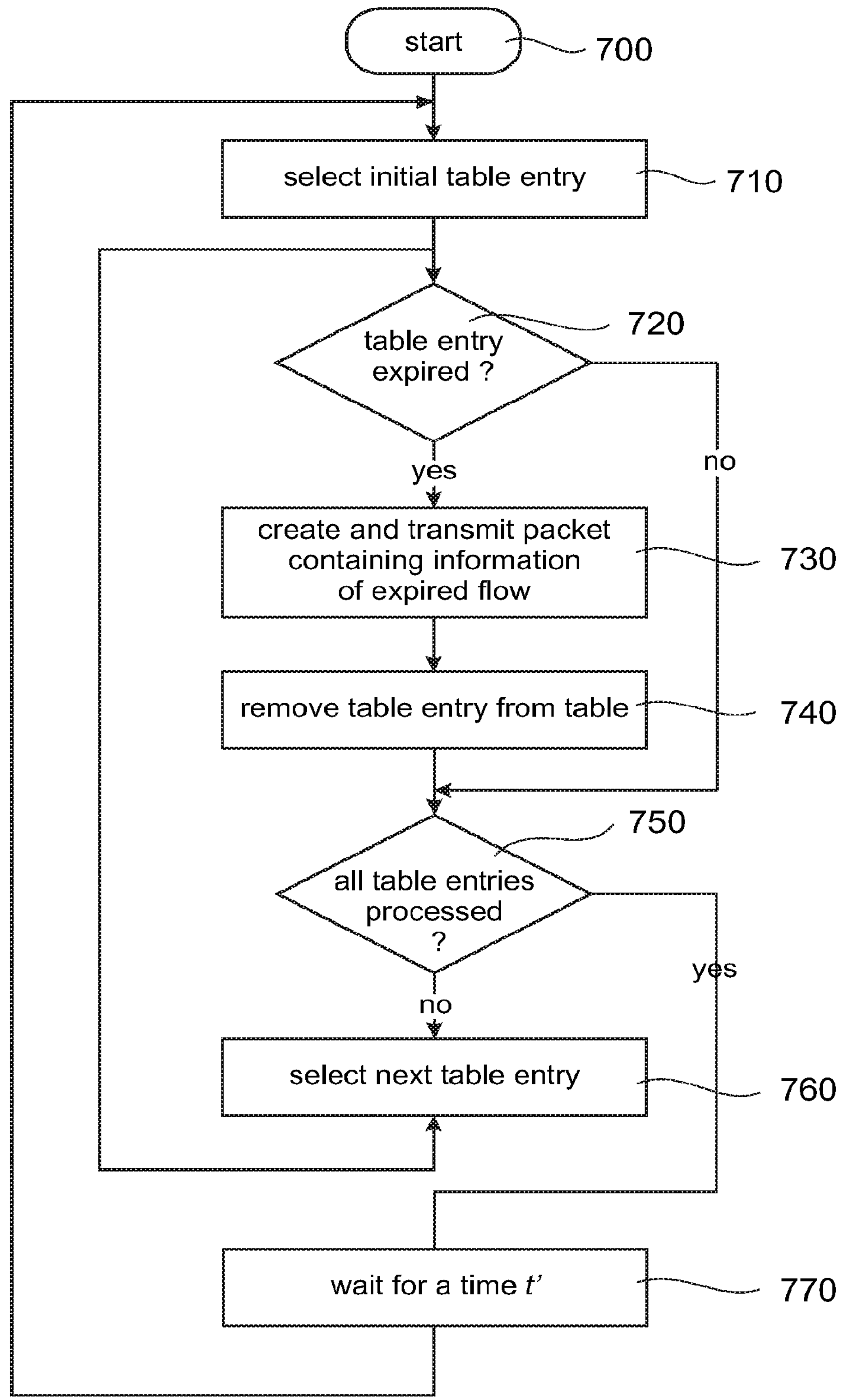
FIG. 7 shows a flow chart illustrating the exportation of expired table entries of the flow table unit.

FIG. 7 shows a flow chart illustrating the export of expired table entries to a server or another destination.

In step 700 the programmable controller 140 triggers the export process by sending a "generate packet" command to the flow information export unit (packet generator) 440. In step 710 flow information export unit 440 selects an initial entry of the flow table unit 430 and checks in step 720 if the respective entry is marked as expired. If this is the case, the flow information export unit 440 creates and transmits in step 730 a flow information packet containing network flow information of the expired network flow of the respective flow table entry. The flow information export unit 440 may export a flow information packet to a central server or any other destination. In a following step 740 the respective table entry is removed from the flow table unit 430. In a following step 750 the flow information export unit 440 checks if all table entries have been processed, i.e. checked for flows that are marked as expired. If the result of step 720 is that the respective flow table entry is not marked as expired, the export process continues with step 750 as well. If the checking of step 750 is negative, in step 760 the next flow table entry is selected for processing and the export process is continued with step 720. If the checking of step 750 is positive, the export process is finished for the meantime. The exportation function of the flow information export unit 440 waits then in step 770 for a time t" until it receives a new generate packet command from the programmable controller 140.

Figure 8:
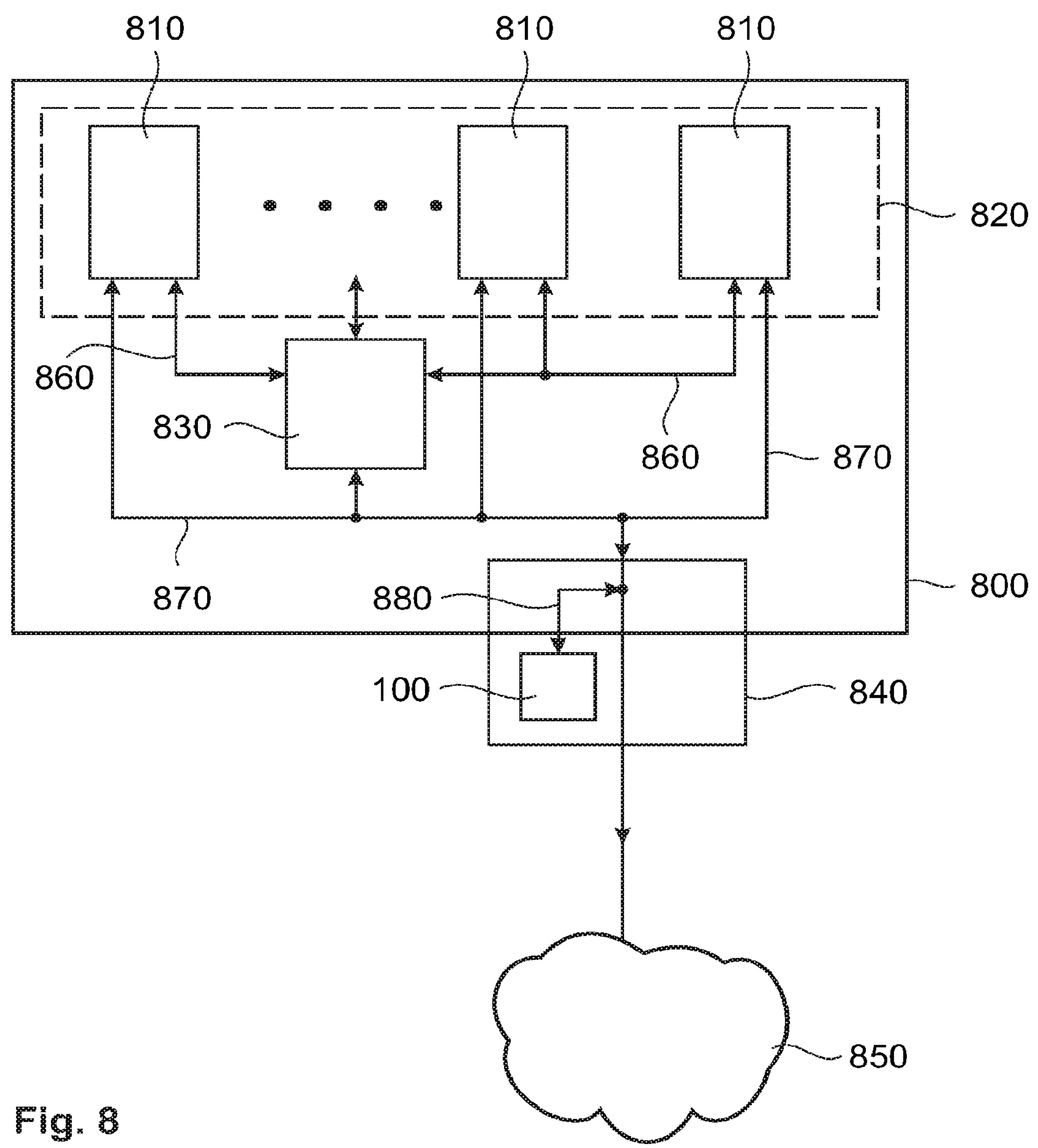
FIG. 8 shows a schematic drawing of a computer system comprising virtual computing systems and an apparatus for analyzing the network flow between the virtual computing systems.

FIG. 8 shows a schematic drawing of a virtualized server environment comprising an apparatus for analyzing the network flow between virtual computing systems.

The virtualized server environment comprises a computer system 800 comprising two or more virtual computing systems 810 that run on a central processing unit 820 of the computer system 800. The computer system 800 comprises further a software networking device 830 for internal communication between the virtual computing systems 810 and a hardware networking device 840 for external communication between the virtual computing systems 810 and an external device 850.

The software networking device 830 is provided for managing and controlling the internal communication between the virtual computing systems 810. It may be e.g. a software switch, i.e. a switch implemented in software.

The hardware networking device 840 may be e.g. a network adapter or a hardware switch. It is provided for managing and controlling the external communication between the virtual computing systems 810 and an external device 850. The external device 850 can be e.g. another computer system, a network, the internet or any other destination the computer system 800 would like to communicate with.

The hardware networking device 840 comprises the apparatus 100 for analyzing a network flow. The apparatus 100 is implemented in hardware as hardware assist device for the central processing unit 820 of the computer system 800.

The virtual computing systems 810 may communicate with each other via the software networking device 830 and a virtual local network 860. The virtual local network 860 could be e.g. a Virtual Local Area Network (VLAN).

The hardware networking device 840 can communicate with the virtual computing systems 810 and with the software networking device 830 by means of a virtual Input/Output (I/O) server partition 870

The software networking device 830 is provided for forwarding the network flow or parts of the network flow occurring in the software networking device 830 to the apparatus 100. The hardware networking device 840 is provided for forwarding the network flow or parts of the network flow occurring in the hardware networking device 840 to the apparatus 100. The software networking device 830 may use the virtual Input/Output (I/O) server partition 870 for forwarding the network flow or parts of the network flow to the apparatus 100. The hardware networking device 840 may use a hardware bus 880 for forwarding the network flow or parts of the network flow to the apparatus 100.

The computer system 800 allows for monitoring and analyzing the network flow between the virtual computing systems 810 and/or between the virtual computing systems 810 and the external device 850 in a scalable way. There is no additional software needed on the computer system 800 and on the virtual computing systems 810.

The disclosed embodiments may be combined with one or several of the other embodiments shown and/or described. This is also possible for one or more features of the embodiments.

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments to unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments. Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Computer program means or computer program in the present context mean any expression, in any language, code or notation, of a set of instructions intended to cause a system having an information processing capability to perform a particular function either directly or after either or both of the following a) conversion to another language, code or notation; b) reproduction in a different material form.

The invention claimed is:

1. An apparatus for analyzing a network flow, the apparatus comprising:

a parser configured to extract flow identification information from the network flow;

a flow metering unit configured to extract flow status information from the network flow; and a programmable controller configured as a state machine and to control in parallel the parser and the flow metering unit by:

sending parsing instructions to the parser in response to receiving the flow identification information from the parser, and sending metering instructions to the flow metering unit in response to receiving the flow identification information from the flow metering unit, the state machine comprising a transition rule memory, a rule selector, and a state register, wherein the rule selector is configured to receive an external input signal and receive an internal input signal from the state register indicating a current state, and wherein the rule selector is configured to:

observe the internal and external input signals in accordance with transition rules of the transition rule memory, change a state of the state register based on the observation of the transition rules, and generate an output signal to the flow metering unit based on the state of the state register, wherein the output signal includes the parsing instructions and the metering instructions.

2. The apparatus according to claim 1, wherein the programmable controller is configured to:

evaluate in parallel two or more flow status information values of the flow metering unit; and send two or more metering instructions corresponding to the two or more flow status information values in parallel to the flow metering unit.

3. The apparatus according to claim 1, wherein the programmable controller comprises a program memory configured to store two or more flow metering programs.

4. The apparatus according to claim 1, wherein the flow metering unit comprises:

a flow table unit;

a flow table management unit; and a flow information export unit.

5. The apparatus according to claim 4, wherein the flow table management unit comprises a programmable hash function unit provided with two or more selectable hash functions for mapping the flow identification information on a hash index, wherein the programmable controller is configured to select one of the two or more selectable hash functions.

6. The apparatus according to claim 4, wherein the programmable controller is configured to send table management commands to the table management unit.

7. The apparatus according to claim 1, wherein the network flow is between at least two virtual computing systems.

8. The apparatus according to claim 7, wherein the apparatus is in communication with a software networking device configured to manage the network flow between the at least two virtual computing systems; and wherein the apparatus receives the network flow from the software networking device.

9. A system, the system comprising:

a programmable controller, which analyzes a plurality of network flows, configured to:

receive parser information from a parser and flow status information from a flow metering unit corresponding to at least one of the plurality of network flows;

control an extraction of flow identification information from the at least one of the plurality of network flows by the parser in response to the received parser information; and control a metering of the at least one of the plurality of network flows by the flow metering unit in response to the flow status information, wherein the programmable controller includes a transition rule memory, a rule selector, and a state register, wherein the rule selector is configured to receive an external input signal and an internal input signal, wherein the external input signal includes the parser information from the parser and the flow status information from the flow metering unit, wherein the internal input signal is from the state register and indicates a current state, and wherein the rule selector is configured to:

analyze the internal input signal and the external input signal in accordance with transition rules of the transition rule memory; and generate an output signal to the flow metering unit based on the analysis of the internal input signal and the external input signal, wherein the output signal includes the parsing instructions and the metering instructions.

10. The system of claim 9, further comprising:

at least two virtual computing systems configured to communicate via the at least one of the plurality of network flows; and a software networking device in communication with the system and configured to manage the at least one of the plurality of network flows, wherein the system receives the network flow from the software networking device.

11. The system of claim 9, further comprising:

an external device;

at least one virtual computing system configured to communicate with the external device via the at least one of the plurality of network flows; and a hardware networking device in communication with the system and configured to manage the at least one of the plurality of network flows, wherein the system receives the network flow from the hardware networking device.

12. The system of claim 9, wherein the programmable controller is configured to:

configure the parser and the flow metering unit to handle multiple types of data within the plurality of network flows.

13. A method for analyzing a plurality of network flows, comprising:

receiving, by a programmable controller, parser information from a parser and flow status information from a flow metering unit corresponding to at least one of the plurality of network flows;

controlling, by the programmable controller, an extraction of flow identification information from the at least one of the plurality of network flows by the parser in response to the received parser information; and controlling, by the programmable controller, a metering of the at least one of the plurality of network flows by the flow metering unit in response to the flow status information, the programmable controller including a transition rule memory, a rule selector, and a state register, receiving, by the rule selector, an external input signal including the parser information from the parser and the flow status information from the flow metering unit; and receiving, by the rule selector, an internal input signal from the state register indicating a current state, analyzing, by the rule selector, the internal input signal and the external input signal in accordance with transition rules of the transition rule memory; and generating, by the rule selector, an output signal to the flow metering unit based on the analysis of the internal input signal and the external input signal, the output signal including the parsing instructions and the metering instructions.

14. The method of claim 13, further comprising:

configuring, by the programmable controller, the parser and the flow metering unit to handle multiple types of data within the plurality of network flows.

* * * * *